United States Patent [19]

Luff et al.

[11] Patent Number: 4,483,488
[45] Date of Patent: Nov. 20, 1984

[54] METHOD AND APPARATUS FOR RECOVERING THERMOPLASTIC FROM COATED FABRIC SCRAP

[75] Inventors: Bruce A. Luff, Center Valley; Michael C. Kazarnowicz, Wescoesville, both of Pa.

[73] Assignee: Air Products and Chemicals, Inc., Allentown, Pa.

[21] Appl. No.: 485,493

[22] Filed: Apr. 21, 1983

Related U.S. Application Data

[63] Continuation of Ser. No. 278,936, Jun. 30, 1981, abandoned.

[51] Int. Cl.³ ................... B02C 13/02; B02C 23/08
[52] U.S. Cl. ................................ 241/23; 241/24; 241/DIG. 37
[58] Field of Search .............. 241/23, 24, 65, 79.1, 241/DIG. 31, DIG. 37; 55/518, 815; 209/233, 352, 363, 392

[56] References Cited

U.S. PATENT DOCUMENTS

| | | | |
|---|---|---|---|
| 2,879,005 | 3/1959 | Jarvis | 241/23 X |
| 3,614,001 | 10/1971 | Belke | 241/23 |
| 3,624,009 | 11/1971 | Sussman et al. | |
| 3,666,185 | 5/1972 | Williams | 241/23 |
| 3,718,284 | 2/1973 | Richardson | 241/23 |
| 3,749,322 | 7/1973 | Reynolds | 241/24 |
| 3,768,739 | 10/1973 | George | 241/65 |
| 3,771,729 | 11/1973 | Frable | 241/23 |
| 3,836,486 | 9/1974 | Hafner | |
| 3,873,411 | 3/1975 | Drelich et al. | |
| 3,885,744 | 5/1975 | Drage | 241/24 X |
| 3,922,152 | 11/1975 | Kookoothakis | 55/518 X |
| 4,020,992 | 5/1977 | Binger et al. | 241/DIG. 37 X |
| 4,025,990 | 5/1977 | Lovette, Jr. | 241/DIG. 31 X |
| 4,251,034 | 2/1981 | Corr et al. | 241/23 X |
| 4,273,294 | 6/1981 | Hollely et al. | 241/23 X |

Primary Examiner—Mark Rosenbaum
Assistant Examiner—Timothy V. Eley
Attorney, Agent, or Firm—Richard A. Dannells, Jr.; James C. Simmons; E. Eugene Innis

[57] ABSTRACT

The invention relates to cryogenically cooling and impacting thermoplastic coated fabric to liberate the thermoplastic from the fabric and screening the resulting thermoplastic fabric mixture in a multi-deck vibratory screener into a coarse fabric segment, a thermoplastic fines segment and a third segment. The third segment is separated into a fabric fines segment and a coarse thermoplastic segment in, for example, an air classifier. The recovered thermoplastic coarse and fines segments can be reused in all applications for regrind thermoplastic material.

5 Claims, 2 Drawing Figures 4,483,488

METHOD AND APPARATUS FOR RECOVERING THERMOPLASTIC FROM COATED FABRIC SCRAP

CROSS REFERENCE TO RELATED APPLICATION

This application is a continuation of application Ser. No. 278,936, filed June 30, 1981, now abandoned.

TECHNICAL FIELD

This invention relates to recovering the thermoplastics recovered from plastic coated fabric scrap. More particularly, it relates to cryogenically grinding thermoplastic coated fabric scrap and separating and reclaiming the thermoplastic from the fabric.

BACKGROUND OF THE PRIOR ART

Coated fabrics, which typically include polyvinyl chloride (PVC) or vinyl, on such fabrics as cotton, nylon, rayon, polyester and combinations thereof are found in a variety of finished products including automotive upholstery, furniture, wallpaper and luggage. In the bonding of the sheet vinyl to the fabric scrim, the fabricator trims the edges before the coated fabric is shipped to the end user. Today, it has been estimated that among the major manufacturers of vinyl coated fabrics, tens of millions of pounds of PVC are lost because there is no economical way to separate the vinyl from its fabric backing.

Chemical methods for achieving this separation, i.e., processes described and claimed in U.S. Pat. Nos. 3,624,009; 3,836,486; and 3,873,411, have to date not been considered to be economical processes for the recovery of PVC.

There have been an increasing number of prior art recovery processes employing cryogenic embrittlement; see U.S. Pat. Nos. 2,879,005; 3,614,001; 3,666,185; 3,718,284; 3,768,739; 3,885,744; 3,749,322; 4,020,992, 4,025,990 and 4,251,034 as well as the relevant references cited therein.

The prior art cryogenic processes have been effective to embrittle the thermoplastic coating and to liberate the thermoplastic from the material on which the plastic is bonded. However, all of the prior art processes, whether taken alone or in combination, have neither disclosed nor suggested a viable means for separating thermoplastic from the fabric after such liberation.

Specifically, it has been found that a very poor recovery of PVC is obtained by a combination of the cryogenic grinding, impacting and screening steps disclosed in U.S. Pat. No. 2,879,005 or U.S. Pat. No. 4,020,992 with the air separating means disclosed in U.S. Pat. No. 3,885,744.

SUMMARY OF THE INVENTION

In sharp contrast to the method and apparatus that one having ordinary skill in the art would come up with upon making a selected combination of references, the present invention provides an economically viable apparatus and method for recovering at least a majority of the thermoplastic from thermoplastic coated fabric wastes. Briefly the process comprises:

(a) cryogenically chilling the coated fabric until the thermoplastic becomes embrittled, (b) passing the chilled coated fabric into a rotary impact mill, (c) impacting the fabric in the mill to liberate the thermoplastic from the fabric, (d) feeding the liberated thermoplastic and fabric to a multi-deck vibrational screening means, (e) separating the feed to the screening means into coarse fabric, thermoplastic fines and a third segment, (f) passing the third segment from the screening means into a classifier means, and (g) separating the third segment from the screening means into a coarse thermoplastic product and fabric fines in the classifier means.

Examples of thermoplastic materials or resins which can be used in place of PVC in the coating of fabrics include the polymers and copolymers of styrene, acrylonitrile, olefins having at least one aliphatic mono-1-olefin with a maximum of 8 carbon atoms per molecule and PET (polyethylene terphthalate). Vinyl chloride homopolymers and copolymers have enjoyed the widest acceptance for a coating and are considered to be the preferred thermoplastics for the present invention.

The temperature range for the chilling the thermoplastic in the process of this invention has been found to be critical and should be from approximately $-90°$ to $-160°$ C., preferably $-100°$ to $-120°$ C. Temperatures warmer than about $-90°$ C. have been found to be insufficient to obtain good liberation of the vinyl from the fabric. At temperatures lower than about $-160°$ C., the process loses its economic advantage.

DETAILED DESCRIPTION OF THE DRAWINGS

While the invention is broadly applicable to the recovery of any thermoplastic used to coat fabrics, it has been described herein with specific reference to PVC.

Figure 1:
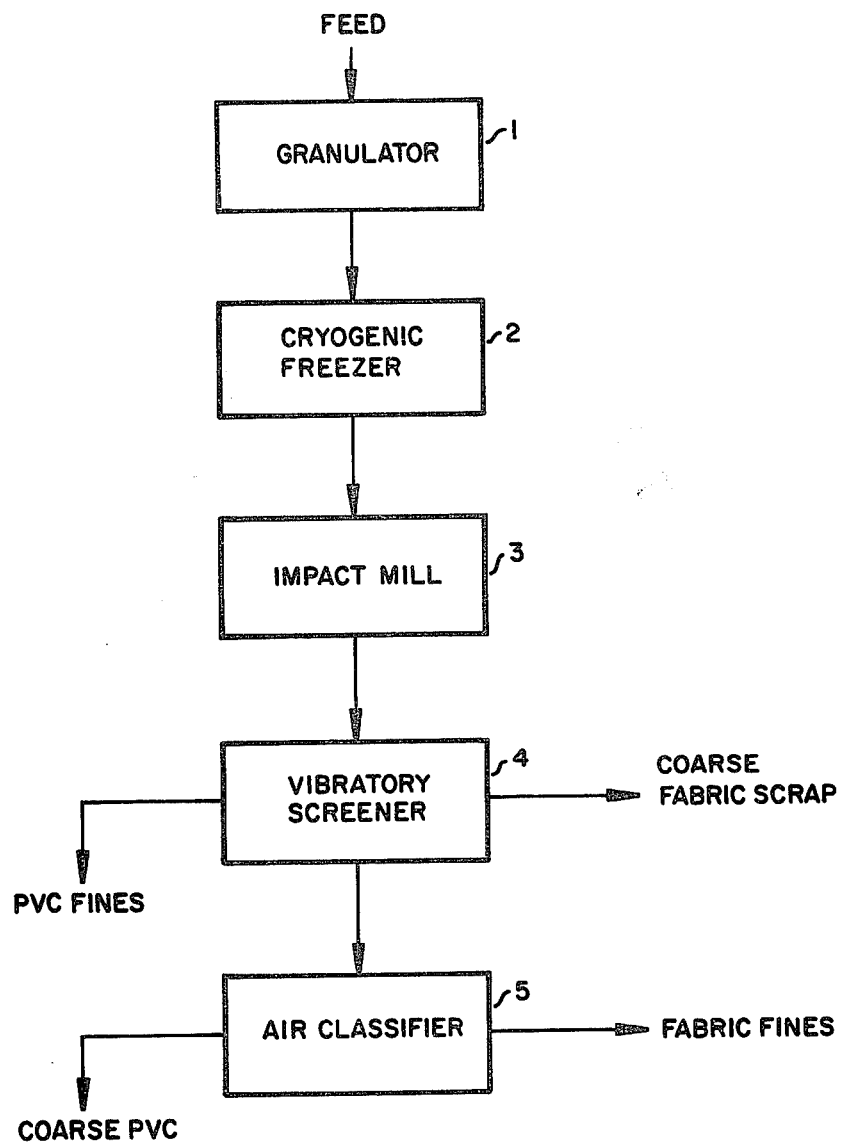
FIG. 1 is a block flow diagram of the main steps for the process of the present invention.

Referring now to FIG. 1, the PVC coated fabric scrap is fed into granulator 1. After the fabric scrap has been shreaded, comminuted or otherwise cut into relatively small pieces, the pieces are conveyed to cryogenic freezer 2. In freezer 2 the pieces are chilled to the desired cryogenic temperatures before being passed to rotary impact mill 3 where the PVC becomes liberated from the fabric. The vinyl and fabric and then passed to multi-deck vibratory screener 4 to separate out the vinyl fines having an approximate particle size of 60 mesh or less based on U.S. standard sieves and preferably less than 80 mesh and the fabric fluff having a size of greater than 4 mesh and preferably greater than 16 mesh. The remaining vinyl and fabric particles having a preferred size range of between about 4 mesh, preferably 16 mesh and 80 mesh are then conveyed to air classifier 5 which separates the material into fabric fines and a coarse PVC product.

Figure 2:
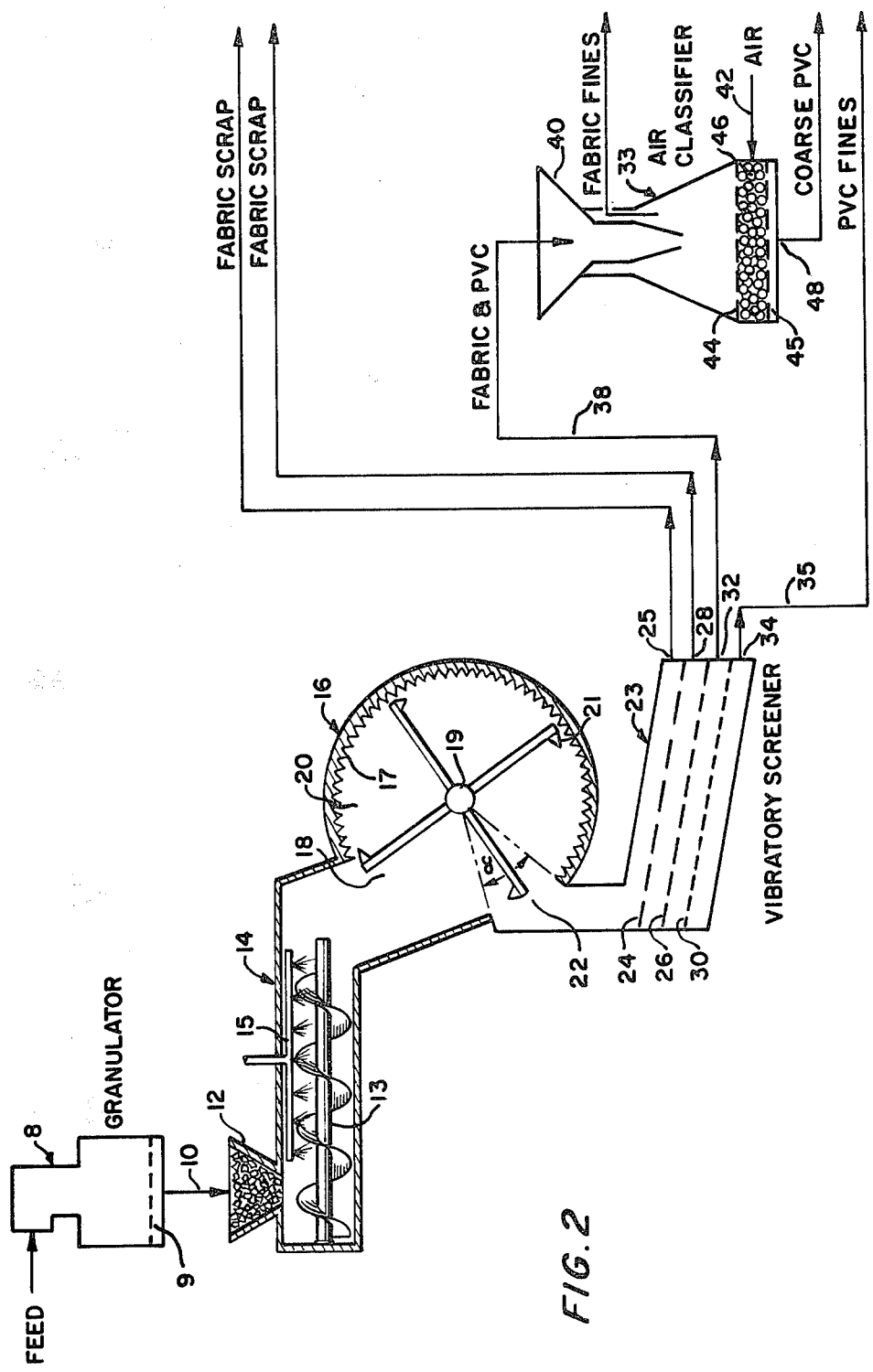
FIG. 2 is a schematic flow diagram of the apparatus and process of the present invention.

FIG. 2 depicts the preferred embodiment of the present invention in which the vinyl coated fabric waste material is fed into granulator 8 where it is reduced into pieces typically of about ½ inch or less by granulator 8. A suitable granulator is marketed by Polymer Machinery Corporation of Berlin, Conn. The pieces from granulator 8 are passed through ½-inch retaining screen 9 and are conveyed via conveyor 10 into hopper 12 from which they are fed into cryogenic freezer 14 such as the CRYO-GRIND ® freezer unit marketed by Air Products and Chemicals, Inc., Allentown, Pa. The pieces are fed through the freezer system via double solid-flight screw 13 operating in the range of 1 to 50 RPM. A solid-flight screw avoids the problem of the bridging of pieces of material which occurs during the use of the standard cut-flight conveyer screw. Liquid nitrogen is sprayed into the freezer 14 via manifold 15 to chill the PVC to less than about −120° C.

From the exit of freezer 14, the chilled pieces drop by gravity into rotary impact mill 16 which agitates and impacts the chilled pieces to liberate the PVC from the fabric backing. A suitable rotary impact mill for use in the present invention is available from Micro Pulverizing Machine Product Company such as the Mikro-Pulverizer free-swinging hammermill which preferably has its standard mill head replaced with a type "W" or "ward" head. A more complete description of a suitable type of rotary mill is disclosed and claimed in application Ser. No. 44,296, filed May 31, 1979 and now U.S. Pat. No. 4,273,294 which is assigned to Air Products and Chemicals, Inc., the pertinent disclosure of which is incorporated herein by reference.

Specifically, the standard herringbone or round hole retaining screen of the rotary mill is replaced by multiple deflector lining 17 and an outlet opening 22 which is immediately adjacent inlet 18 of impact mill 16 from freezer 14 and subtends an angle α of between 5° and 60°, preferably between 20° and 50°, and more preferably between 40° and 50° at rotatable shaft 19 of grinding chamber 20 and which extends substantially the entire width of the grinding chamber. Grinding chamber 20 contains a multiplicity of hammers 21 which are pivotably mounted on rotatable shaft 18 which operates at speeds of up to 7000 RPM. Opening 22 in deflector lining 17 should be completely unobstructed so that a minimum of 70% of the embrittled pieces entering mill 16 can leave it before rotating past inlet 18 of the mill. Preferably, at least 85% and more preferably at least 95% of the embrittled material entering mill 16 should leave it before passing inlet 18. Without this feature it has been found that fabric fluff builds up in chamber 20 and overloads mill 16.

From mill 16 the separated PVC and fabric pieces are conveyed by gravity or otherwise fed into multi-deck vibratory screener 23 which is normally inclined from the horizontal as shown in FIG. 2. A suitable screener is manufactured by Prater Industrial Products, Inc. of Chicago, Ill. Although more than one screening deck are sufficient to obtain the desired separation between the PVC fines, the coarse fabric scrap and a third segment which comprises a mixture of coarse PVC and fabric fines, it has been found that ideally a triple deck screener permits one to make the separation most efficiently. The material from mill 16 first comes in contact with 4 mesh screen 24 where the largest fabric fluff or clumps are removed through outlet 25. The smallest fabric fibers become conglomerated after passing through 4 mesh screen 24 and lodge on top of 16 mesh screen 26 before being removed through outlet 28. It has been found that if the 16 mesh screen is omitted and only a 4 mesh screen is used, a large amount of fluff is carried over into the air classifier resulting in a loss in the recovery of PVC product. Most of the material passing through screen 26 lodges on a 60 mesh, preferably an 80 mesh, screen 30 before being passed through outlet 32 for passage to air classifier 33. The PVC fines passing through 60-80 mesh screen 30 amount to less than 50%, preferably no more than 25% of the vinyl in the feed to granulator 8. The PVC fines are removed through outlet 34 and are conveyed via conveyor 35 for storage and use in the PVC regrind product.

It has been found that a suitable air classifier 33 for separating the 16-80 mesh material retained on the top of screen 30 is a Fluid Bed Reclaimer marketed by Sweco, Inc. of Florence, Ky.

The mixture of fabric fines and coarse PVC mixture is conveyed from vibratory screener 23 via conveyor 38 into hopper 40. The mixture from hopper 40 falls against a countercurrent flow of air entering through inlet 42 onto perforated vibrating plate 44. The space between plate 44 and a second perforated vibrating plate 45 is occupied by a plurality of metal balls 46 which aid in the distribution of air and in making a sharp separation between the fabric fines and the coarse PVC. The coarse PVC product works its way through plate 44, balls 46 and plate 45 and is recovered from the heavy particle discharge chute 48 at the lower portion of classifier 33.

The method and apparatus of the present invention are further illustrated by reference to the following examples.

EXAMPLE 1

Scrap material of PVC-backed woven cotton fabric was processed in a manner generally illustrated in FIG. 2. Table I summarizes the data obtained in the recovery of vinyl product from the scrap material.

Specifically the scrap material was first granulated in rotary knife granulator 8 and through a ½-inch retaining screen. The product from granulator 8 was collected and stored in 55-gallon fiberboard drums. The material was then hand fed from the drums to cryogenic freezer 14. From the freezer, it passed by gravity into impact mill 16. The operating variables were as follows:

| Production Rate | 1,200 lb./hour |
|---|---|
| Liquid Nitrogen Consumption | 0.5 lb. LIN/lb. scrap |
| Freezer Temperature Range, °C. | −104 to −112° C. |

From the impact mill, the material was collected and stored in 55 gallon fiberboard drums. The material from the impact mill was hand fed from the drums into vibratory screener 23. The types and amounts of separated products were as follows:

| +11 mesh coarse fabric | 67.5 lbs. |
|---|---|
| −11 + 60 mesh material | 61.0 lbs. |
| −60 mesh PVC fines | 24.0 lbs. |
| TOTAL | 152.5 lbs. |

From the screener, the +11 mesh fabric product stream was considered waste and was discarded. The −60 mesh PVC product was collected in drums and saved as usable product. The −11+60 mesh material was collected in drums and subsequently fed into a Sweco ® Fluid Bed Reclaimer 33. The Sweco Fluid Bed Reclaimer contained 10 mesh screens 44 and 45 and a plurality of 3/16 inch stainless steel balls 46 filling the space between. The following amounts were recovered:

| Fabric fines | 14.5 lbs. |
|---|---|
| Coarse vinyl product | 46.5 lbs. |

EXAMPLES 2-3

The process steps set forth under Example 1 were repeated in Example 2 and 3 and the results are summarized in Table I below.

EXAMPLE 4

PVC-backed nonwoven synthetic fabric scrap was processed in the same manner as in Example 1 except that a portion of the −11 to +80 mesh material from screener 23 was fed at a rate of 109 pounds/hour into a Sweco Fluid Bed Reclaimer containing a pair of perforated plates 44 and 45 having 0.156 inch diameter perforations and 17% open area and another portion was fed at a rate of 304 pounds/hour into the same air classifier containing a pair of plates having 0.066 inch diameter perforations and 10% open area. The average of the results from the foregoing procedure are summarized in Table I below.

| Example | 1 | 2 | 3 | 4 |
|---|---|---|---|---|
| Production Rate (lb./hr.) | 1200 | 820 | 920 | 700 |
| Liquid Nitrogen Consumption (lb. LIN/lb. scrap) | 0.5 | 0.6 | 0.6 | 0.5 |
| +4 mesh Coarse Fabric, lbs. | — | 140 | 169 | — |
| +11 mesh, Coarse Fabric, lbs. | 67.5 | — | — | 575 |
| −4 + 80 mesh, lbs. | — | 135 | 172 | — |
| −11 + 60 mesh, lbs. | 61.0 | — | — | — |
| −11 + 80 mesh, lbs. | — | — | — | 232 |
| −60 mesh vinyl Fines, lbs. | 24.0 | — | — | — |
| −80 mesh vinyl Fines, lbs. | — | 20 | 24 | 43 |
| Total, lbs. | 152.5 | 295 | 365 | 850 |
| Fabric Fines, lbs. | 14.5 | 24 | 27 | 52 |
| Coarse Vinyl, lbs. | 46.5 | 111 | 145 | 212 |
| Total Fabric, lbs. | 82.0 | 164 | 196 | 627 |
| Fabric Yield, wt %* | 53.8 | 55.6 | 53.7 | 73.8 |
| Total Vinyl Reclaimed, lbs. | 70.5 | 131 | 169 | 255 |
| Total Vinyl Reclaimed Yield, wt %** | 46.2 | 44.4 | 46.3 | 30 |
| Total Yield of the available vinyl, wt %** | ~77 | ~74 | ~77.2 | ~50 |

*Based on total feed to screener.
**Based on 60 wt % vinyl in the scrap material to the granulator.

The total yields of reclaimed vinyl were all based on batch operations which comprised hand feeding the multi-deck vibratory screener and the air classifier from material stored in drums. This resulted in a settling of the material in the drums and a trapping of the vinyl in the matted fabric which made product separation more difficult. In the preferred embodiment shown in FIG. 2, in which the material from the outlet of rotary hammermill 16 continuously falls by gravity directly into the inlet of multi-deck vibratory screener 23 and the material from outlet 28 is continuously conveyed to air classifier 33, the total vinyl yields are expected to increase to at least 80 to 85% and as high as 90% by weight.

Controls A-D

To indicate the criticality in making the proper combination of screening and classifying means for the process and apparatus of this invention, the data from five controls are summarized in Table II below.

The procedure for each of the controls was to process the PVC-backed woven cotton through the granulator, cryogenic freezer and impact mill as described under Example 1. The material was stored in the 55 gallon fiber drums and was separated through four separate vibratory screeners manufactured by Rotex, Inc., Smico Corp., Eriez Magnetics, Inc. and Kason Corporation for Control A-D, respectively. In each case the screen sizes were chosen to recovery of the maximum yield of vinyl while removing as much of the fabric as possible. The net results from the control runs were either that the total yield of vinyl was very low (substantially less than 50 wt %) as in Controls A and B or that the vinyl product recovered was so contaminated with fabric as to make it unacceptable for regrinding into recycled PVC as in Controls C and D.

TABLE II

| CONTROLS | A | B | C | D |
|---|---|---|---|---|
| Fabric Yield, %* | 85.8 | 89 | 67.5 | 64.0 |
| Total Vinyl Reclaimed Yield, %* | 14.2 | 11 | 32.5 | 36.0 |
| Total Yield of the Available Vinyl | ~23.6 | ~18.3 | ~54.2 | ~60.0 |

*Based on toal feed to screener.
**Based on 60 wt % vinyl in the scrap material to granulator.

Further removing the unacceptable contamination of fabric fines from the coarse vinyl product of the control runs by passing the material through a Sweco Fluid Bed Reclaimer, will result in either the material not being fed into the unit properly or too much vinyl will be carried over with the fabric fines. Both of these results will cause the total yield of vinyl to drop substantially below 50% by weight which is considered to be the minimum for an economically viable process.

What is claimed is:

1. A process for recovering thermoplastic from coated fabric which comprises:
   (a) cutting the thermoplastic coated fabric containing about 50 to 75% by weight fabric into smaller pieces;
   (b) cryogenically chilling said pieces of thermoplastic coated fabric until the thermoplastic becomes embrittled;
   (c) passing the chilled fabric into an inlet of a rotary impact mill and rotatably passing the fabric through said impact mill;
   (d) impacting the chilled coated fabric in said mill to liberate the thermoplastic from the fabric and discharging the liberated thermoplastic and fabric so that a minimum of 70% of the chilled fabric entering said mill is discharged before rotating past said inlet and thus preventing a build-up of fabric fluff in said mill;
   (e) feeding the liberated thermoplastic and fabric to a vibrational screening means having at least three decks;
   (f) separating the feed to said screening means into coarse fabric of greater than 16 mesh, thermoplastic fines of less than 60 mesh and a third segment of greater than 60 mesh and less than 16 mesh;
   (g) passing said third segment from said screening means into a gas classifying means containing a plurality of solid balls for aiding distribution of gas and in separating said third segment into fabric fines and a coarse thermoplastic product;
   (h) separating said third segment into said coarse thermoplastic product and said fabric fines in said classifier means by passing a carrier gas countercurrent to said third segment to sweep away said fabric fines; and
   (i) recovering the coarse thermoplastic product from the lower portion of said classifier.

2. The process of claim 1 wherein said coated fabric is chilled to a temperature in the range of approximately −90° to −160° C.

3. The process of claim 1 wherein the chilled coated fabric is passed by gravity into said impact mill and the liberated thermoplastic and fabric are passed by gravity into said multi-deck vibrational screening means.

4. The process of claim 1 wherein said gas is air.

5. The process of claim 1 wherein the impacting, step (d), is carried out in a rotary hammermill.

* * * * *